United States Patent [19]
Joyce, Jr. et al.

[11] 3,786,893
[45] Jan. 22, 1974

[54] AIR CUSHION VEHICLE WITH SELECTIVELY OPERABLE SURFACE TRACTION MEANS

[75] Inventors: Douglas D. Joyce, Jr., Williamsville, N.Y.; Anthony Y. Simpson, New Orleans, La.

[73] Assignee: Textron Inc., Providence, R.I.

[22] Filed: Mar. 31, 1971

[21] Appl. No.: 176,579

[52] U.S. Cl. .............................. 180/119, 180/121
[51] Int. Cl. .......................................... B60v 3/02
[58] Field of Search ................. 180/116–127, 66 F; 115/1; 114/67 R, 67 A

[56] References Cited
UNITED STATES PATENTS

| | | | |
|---|---|---|---|
| 3,095,938 | 7/1963 | Bertelsen | 180/119 |
| 3,227,234 | 1/1966 | Simon | 180/119 |
| 3,302,741 | 2/1967 | Brazuk | 180/66 F X |
| 3,398,713 | 8/1968 | Hall | 180/119 X |
| 3,504,755 | 4/1970 | Buss et al. | 180/119 X |
| 3,586,118 | 6/1971 | Bertin | 180/119 |
| 3,040,688 | 6/1962 | Gram | 180/119 |
| 3,246,712 | 4/1966 | Mackie | 180/119 |
| 2,970,665 | 2/1961 | Russler | 280/DIG. 7 |

*Primary Examiner*—Kenneth H. Betts
*Assistant Examiner*—Terrance L. Siemens
*Attorney, Agent, or Firm*—Bean & Bean

[57] ABSTRACT

An air cushion vehicle including a rigid body extended along a longitudinal axis thereof, and means for producing an air cushion thereunder; at least two wheels equipped with inflatable tires, said wheels depending downwardly from the rigid body and each wheel being on an opposite side of and laterally spaced from the longitudinal axis of the vehicle; and said wheels being located in the central third portion longitudinally of the vehicle. Means are provided for causing said wheels to selectively engage the surface underneath the vehicle (whether it be solid, semi-solid, or fluid) and means for driving the wheels independently in the same direction or in opposite directions, and at the same speed or at different speeds. Also, means are provided for selectively braking said wheels, whereby to assist in propulsion of the vehicle on inclined surfaces, and in the steering of the vehicle during maneuverings over ground or water surfaces.

1 Claim, 8 Drawing Figures

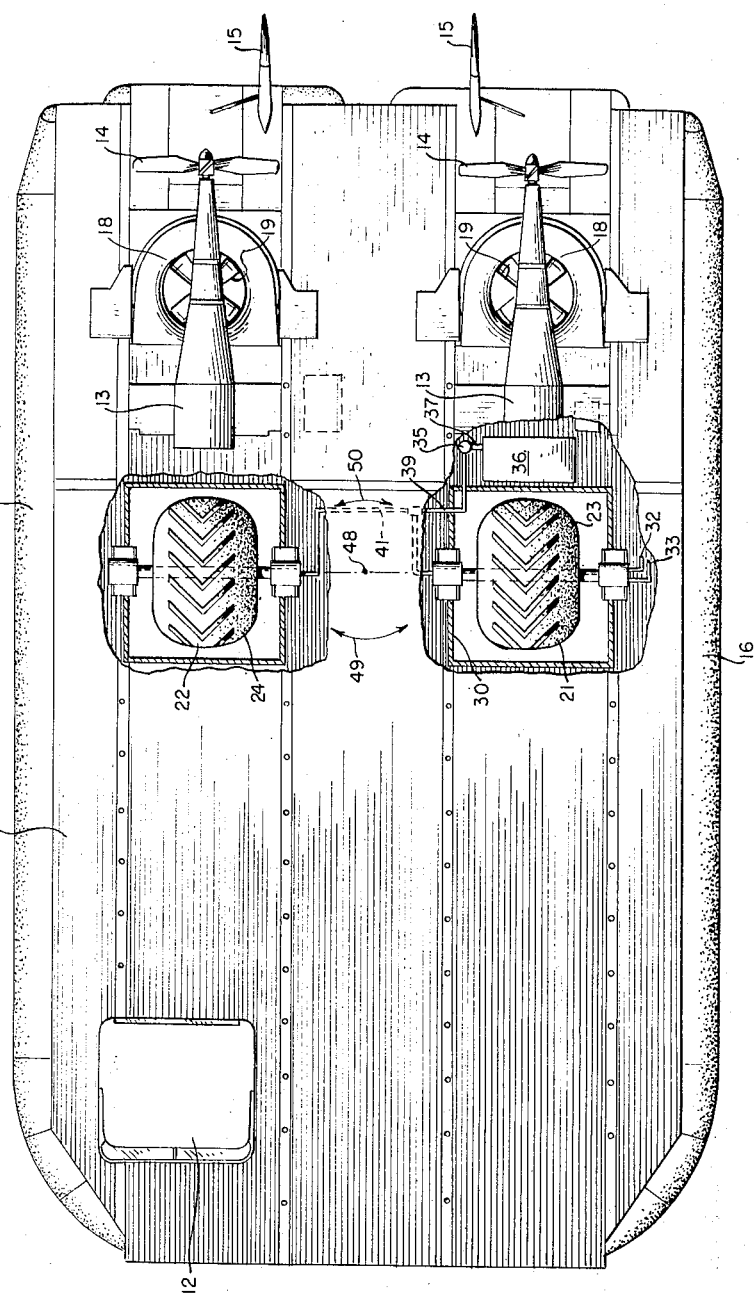

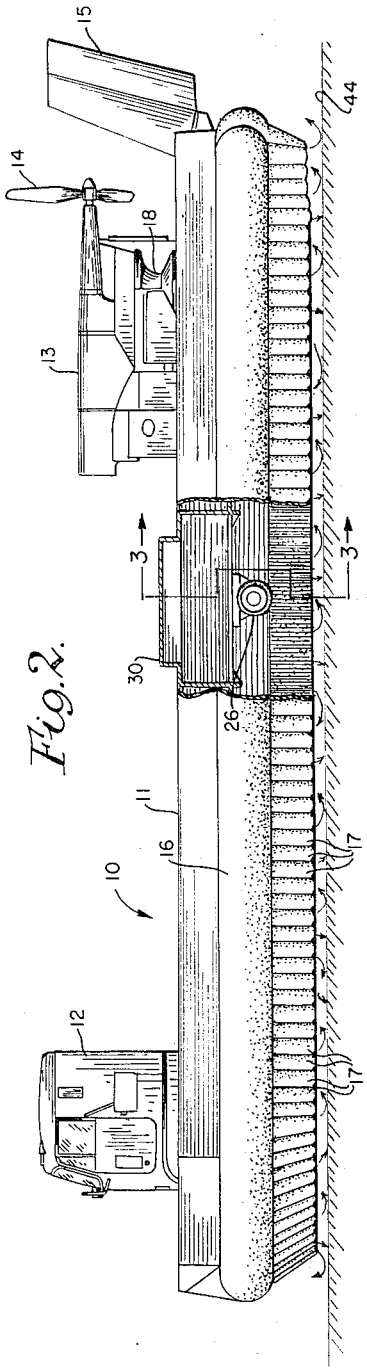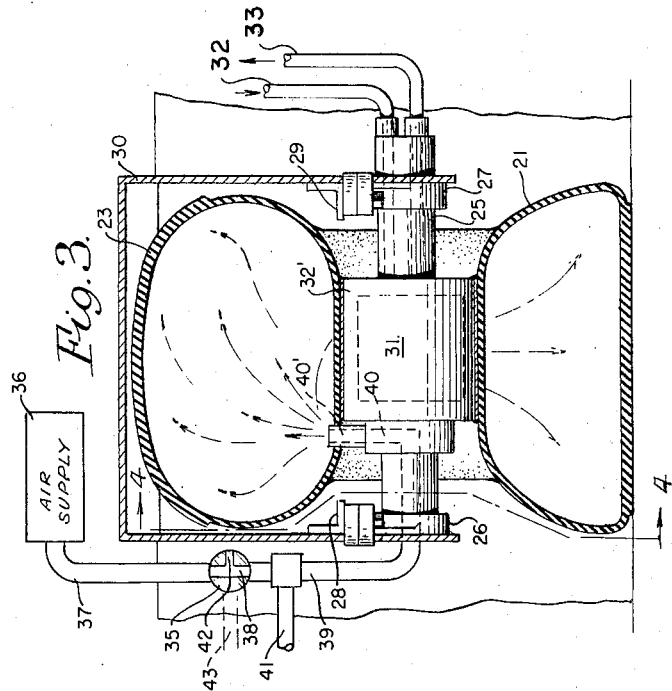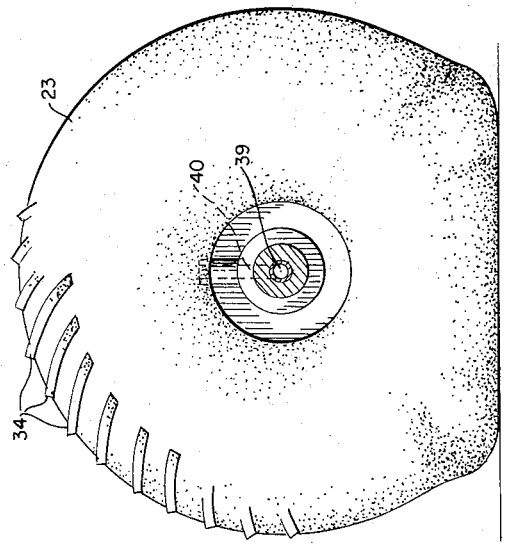

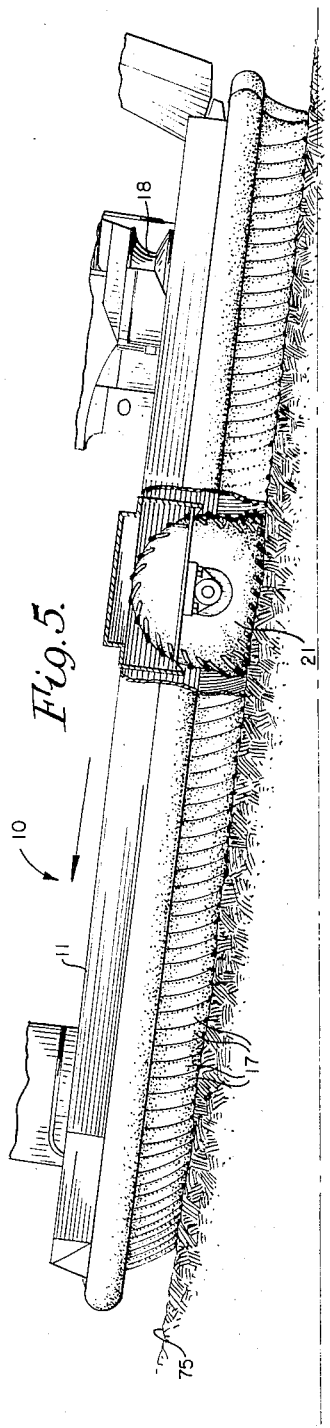
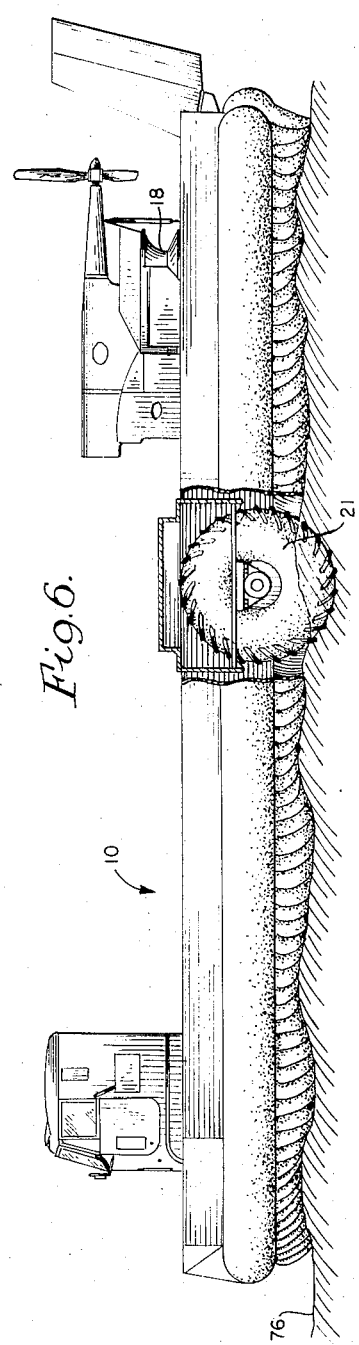

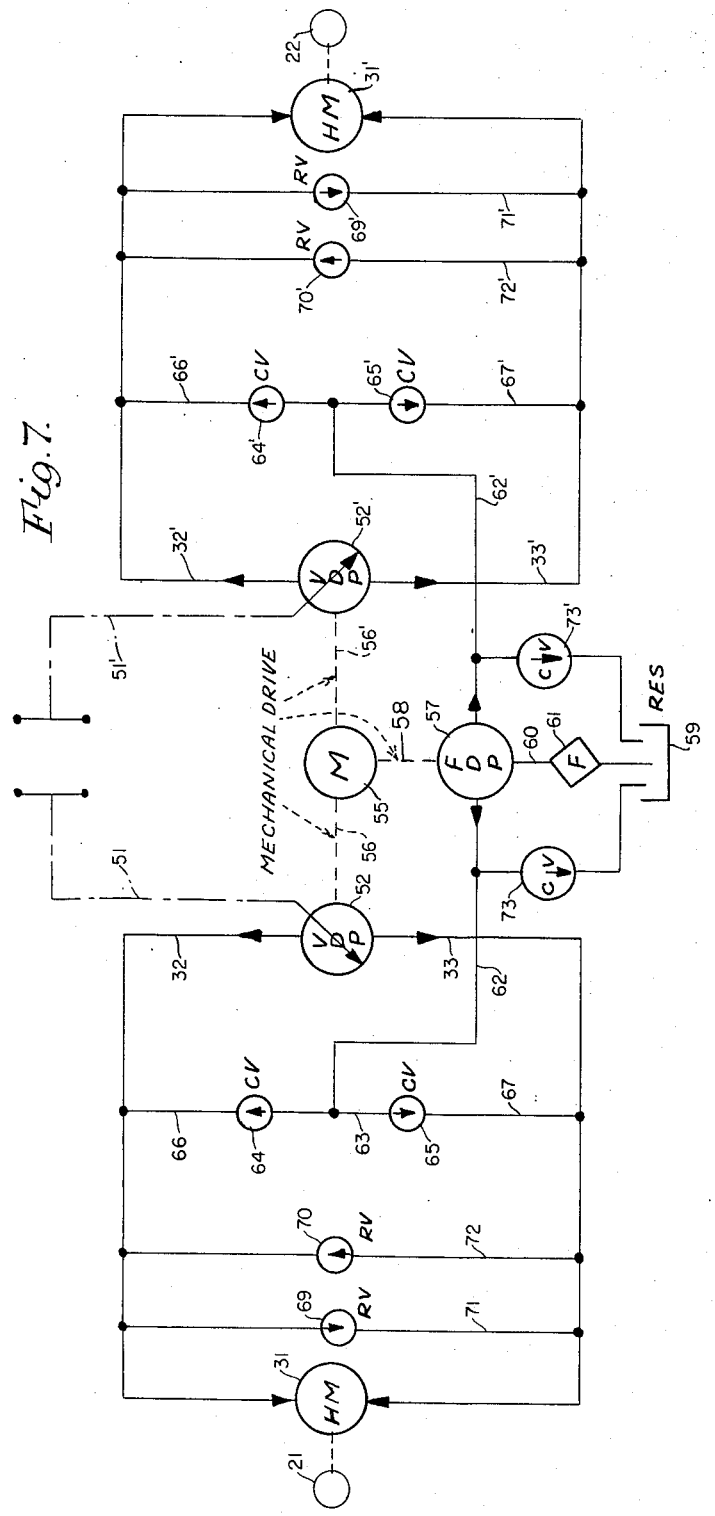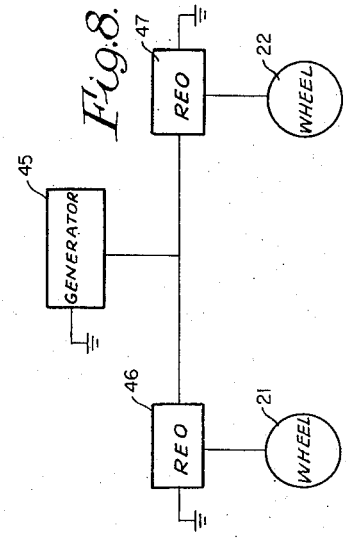

AIR CUSHION VEHICLE WITH SELECTIVELY OPERABLE SURFACE TRACTION MEANS

BACKGROUND AND OBJECTS OF THE INVENTION

The present invention relates to an improved air cushion vehicle having ground traction means which are selectively engageable with the terrain over which the vehicle is traveling to provide both improved additional propulsive effect and directional control coincident with low "foot-print" pressures and improved stability and/or maneuvering control under cross-wind operating conditions.

By way of background, various constructions have been proposed in the past for providing air cushion vehicles with means for tractive engagement with the terrain over which they are traveling. However, prior tractive arrangements possessed certain deficiencies in that they either could not provide precise steering capabilities, or they were so cumbersome that they severely limited the mobility of the vehicle when in air-cushion-borne mode. It is with an improved air cushion vehicle which overcomes the foregoing deficiencies that the present invention is concerned.

It is accordingly an important object of the present invention to provide an improved air cushion vehicle which employs a unique and simple arrangement of wheels which may be selectively brought into or out of engagement with the terrain (ground or water) traversed by the vehicle, so as to aid in its tractive effect such as when traversing an incline; and also to provide an improved and extremely precise directional and maneuvering control capability under "normal" as well as cross-wind operating conditions.

Another object of the invention is to provide an improved air cushion vehicle in which the wheels which selectively engage the terrain will not hamper the operation of the vehicle when in air-cushion-borne mode. Other objects and attendant advantages of the present invention will readily be perceived hereafter.

GENERAL DESCRIPTION

The improved air cushion vehicle of the present invention includes a typical "hull" or body having a longitudinal axis, and means for producing thereunder an air cushion; wheel means laterally spaced from said longitudinal axis and depending downwardly from the body; means for causing said wheel means to selectively engage the terrain (which may be any type of land or water or intermediate type surface); and means for driving the wheel means for aiding in propulsion and steering of the vehicle. In a preferred form at least two wheels are used; said wheels being disposed on opposite sides of the vehicle longitudinal axis. The wheels can be driven at the same speed for propelling the vehicle in a forward or rearward direction; or they can be driven at different speeds, or in opposite directions, to steer the vehicle. The wheels are preferably brought into engagement with the terrain by means which inflate the tires of the wheels, so as to extend them into engagement with the terrain. Alternatively, they can be brought into engagement with the terrain by means which reduce the vehicle support effect by reduction of the rate of air volume supply to the air cushion chamber. Various aspects of the present invention will be more fully understood when read in conjunction with the accompanying drawings.

THE DRAWINGS

FIG. 1 is a plan view, partially broken away, to show positional and directional orientation of the wheels on the air cushion vehicle;

FIG. 2 is a side elevational view of the vehicle of FIG. 1, with portions partially broken away to show the manner in which the wheels are mounted, and specifically depicting the wheel tires as being in deflated condition;

FIG. 3 is a combined, schematic and cross-sectional view, taken substantially along line 3—3 of FIG. 2, showing the manner in which the tires can be inflated and deflated, and the manner in which the wheels can be driven;

FIG. 4 is a cross-sectional view taken substantially along line 4—4 of FIG. 3, showing a typical contour which the tires assume when in engagement with a land surface;

FIG. 5 is a side elevational view partially broken away, showing one of the wheels aiding in propulsion of the vehicle up an incline;

FIG. 6 is a side elevational view similar to FIG. 5, but showing the vehicle and a wheel thereof operating in propelling relationship to a water surface;

FIG. 7 is a schematic hydraulic diagram showing a typical arrangement for driving the wheels; and FIG. 8 is a schematic electrical diagram showing an alternate arrangement for driving the wheels.

As illustrated herein, the improved air cushion vehicle 10 may include a body 11 having a control cab 12 and a pair of propulsion units comprising motors 13 driving propellers 14. Thus, airborne directional control may be obtainable by conventional manipulation of rudders as indicated at 15. Mounted on at least part of the periphery of body 11 is an inflated flexible trunk 16 from which depend overlapping flexible hollow fingers 17 which expel jets of air and tend to confine the air cushion beneath the vehicle to provide the desired lift support; the escape of air being underneath fingers 17 such as is schematically depicted in FIG. 2. As is well understood in the art, the vehicle will therefore typically include an air intake duct such as shown at 18, which may be suitably located on the vehicle for supplying air for the air cushion. A "lift air" supply fan 19 is located in duct 18 and is driven by motor 13, which may be of any suitable type. Motor 13 may be of the variable speed type, so as to regulate the amount of air pumped through duct 18 by fan 19, to thus vary the air cushion volume supply underneath the vehicle. By varying the cushion air volume the elevation of the vehicle above the terrain is determined. Alternatively, any other known means may be used to vary the cushion lift effect.

An air cushion vehicle having the foregoing basic structure can be driven satisfactorily across relatively flat terrain, without wheels. However, under certain conditions it is necessary to obtain additional propulsive effort, for example, in climbing an inclined ground surface. To this end, wheels 21 and 22, which are normally out of engagement with the terrain over which the vehicle travels are provided so as to be brought into engagement with the terrain to provide additional propulsive effect, as may be required. Furthermore, by operating wheels 21 and 22 at different speeds; or by braking one of the wheels; or by driving them in opposite directions, accurate directional control may be obtained. This is especially desirable when maneuvering on sloping surfaces and/or in "cross-winds".

Wheels 21 and 22 are preferably fitted with low pressure inflatable, elastic, tires as shown at 23 and 24, respectively; which are in plan view located within the perimeter of the air cushion space under the vehicle. They are preferably so mounted that when the vehicle is supported "on air cushion" they are clear of the terrain. In a preferred form this may be accomplished simply by deflating the tires. When additional propulsive effect is required; for example in climbing an incline, or when accurate directional control is desired, the wheels are brought into contact with the ground as by either reducing the air support cushion height or by inflating the tires, or both. The effect of reducing the cushion lift effect is to lower the vehicle, thereby placing part of the load of the vehicle on the wheels. The amount of weight carried by the wheels and the tractive force resulting therefrom may be varied by adjusting the cushion lift effect. However, the tractive effectiveness of the wheels may also be varied by adjusting the pressures to which the tires are inflated.

Once the wheels are in contact with the terrain, they are to be driven by any suitable means to augment the outputs of the main propulsor units 13-14. Alternatively, the wheels can be rotated at different speeds to steer the vehicle; or, they can be braked to slow down the vehicle. Contact of wheels 21 and 22 with the terrain will also help to control tendencies to sideslip when the vehicle is exposed to cross-winds. When the wheels are no longer needed for any of the above enumerated purposes, they are lifted clear of contacts with the terrain by deflating and venting the tires to the atmosphere. Since the wheels are situated within the air cushion confines, the air cushion pressure helps to force the air out of the tires under such conditions.

More specifically, as shown herein, wheels 21-22 may each include a hub 25, which is suspended from hangers 26 and 27 bolted to struts 28 and 29, respectively; which are in turn suitably secured to wheel housings 30 which in turn are suitably secured to the body 11. Each hub 25 may, by way of example as shown herein, mount a hydrostatic drive unit 31 which includes an outer tire mounting housing 32' which is rotated when unit 31 is supplied with hydraulic fluid through conduits 32 and 33 which are in communication with a suitable hydraulic source, as explained in detail hereafter. Thus, it will be appreciated that if the pressured fluid flow through conduits 32 and 33 is reversed, the direction of rotation of wheel 21 will be reversed. Tire 23, which is preferably a low pressure elastic tire, having by way of example 2.1 psi nominal pressure and a low profile reverse V tread 34, may be inflated/deflated by manipulating valve 35 to effect communication between air supply tank 36 and the inside of tire 23 via conduit 37, valve duct 38, conduit 39 and conduits 40 and 40'. Conduit 41 is in communication with tire 24.

Thus, as noted above, by inflating tires 23 and 24, engagement thereof may be had with land or water surfaces over which the vehicle is traveling to provide the above described advantages. It will be appreciated that each tire 23 and 24 may be inflated/deflated individually by eliminating conduit 41 and by providing each tire with a proper pressure source and an accompanying pneumatic circuit, which may be similar to that shown in FIG. 3. Thus, in event it is desired to deflate tire 23, it is merely necessary to rotate valve 35 so that duct 42 therein is in communication with conduit 39, whereby tire 23 will be vented to the atmosphere via conduits 40', 40 and 39, valve conduit 42 and vent 43 which is in communication with conduit 38. As noted above, since the tires are within the air cushion space, the pressure of the latter will aid in deflating tire 23. If desired the valving can include means operable to place tires 23 and 24 in communication with a source of suction to hasten their deflation. While only the structure of wheel 21 and tire 23 have been described above, it will be understood that wheel 22 and tire 24, respectively, are analogous thereto and contain analogous structure.

The wheels 21 and 22 may be driven at the same speed to provide additional propulsive traction when in engagement with the terrain, or they may be driven at different speeds or in opposite directions, or individually braked to provide an improved mode of maneuverability. An electrical system for effecting the foregoing is shown in FIG. 8. This system includes a generator 45 of any suitable type electrically coupled to variable speed electric motors 46 and 47 which are in turn mechanically coupled to drive wheels 21 and 22, respectively. Therefore, for example, by driving wheels 21 and 22 in reverse directions, the air cushion vehicle can be pivoted about its center 48 (FIG. 1) such as in the direction of arrows 49 and 50. If desired, one wheel can be braked while the other is driven, so as to obtain a similar motion with the braked wheel serving as the center of pivotal motion. By driving wheels 21 and 22 in the same direction and at the same speed, propulsive traction in the direction of the longitudinal axis of vehicle 10 will be augmented. By driving wheels 21 and 22 at different speeds in the same direction, wheels 21 and 22 will provide directional turning forces for steering the vehicle.

Wheels 21 and 22 are preferably located in the center third of the longitudinal extent of the vehicle, that is, substantially amidships, so that by driving the wheels in opposite directions the vehicle 10 can be pivoted about a point such as indicated at 48 which is substantially at its center. It is also to be noted that when wheels 21 and 22 are in engagement with the terrain and are braked simultaneously while the vehicle is hovering, the vehicle will remain stationary without requiring the vehicle operator to jockey the vehicle; this being especially desirable when operating on an inclined terrain. It is to be especially noted that precise steering control with greatly improved stability can thus be obtained by using only two wheels in an arrangement as disclosed herein.

A suitable hydraulic circuit for driving wheels 21 and 22 is shown in FIG. 7. The circuit for wheel 21 includes a mechanical control lever 51 coupled to a variable displacement pump 52 which can effect flow into conduit 32 for driving wheel 21 and in a first direction; or into conduit 33 for driving wheel 21 in a reverse direction. Variable displacement pump 52 is driven by motor 55 through mechanical linkage 56. Motor 55 also drives fixed displacement pump 57 through mechanical linkage 58; pump 57 obtaining its hydraulic fluid from reservoir 59 via a conduit 60 having a filter 61 therein. The output from fixed displacement pump 57 is into conduit 62 which is in communication with conduit 63 having check valves 64 and 65 at opposite ends thereof.

Also in communication with check valves 64 and 65 through conduits 66 and 67, respectively, are conduits 32 and 33, respectively, leading from variable displacement pump 52. The direction of rotation of hydraulic motor 31, which is in communication with conduits 32 and 33, will be determined by whether variable displacement pump is pumping into conduit 32 or 33, and the speed will be determined by the amount of the displacement.

Relief valves 69 and 70 in branch conduits 71 and 72 coupled across conduits 32 and 33 provide a bypass around hydraulic motor 68 in the event wheel 21 is locked. Also associated with conduit 62 is a check valve 73 which permits flow from fixed displacement pump 57 to reservoir 59 when the pressure exceeds a predetermined amount. Wheel 22, which is mechanically coupled to a hydraulic motor 31', is driven through a circuit which is essentially symmetrical to that described with respect to the left-hand portion of FIG. 7. In the interest of brevity all elements of the circuit for driving motor 31', which is analogous to motor 31, have been designated by primed numerals corresponding to the unprimed numerals in the left side of the diagram. Through the medium of the above described circuit each wheel 21 and 22 can be driven at a different speed in either direction; or, if either variable displacement motor 52 or 52' is nulled the corresponding wheel will be braked.

FIG. 5 depicts the mode of operation of the vehicle when climbing an incline. Thus, as shown at 75 the wheels 21 and 22 are shown as providing additional tractive effort by engaging the ground surface. Ground engagement in this instance is effected by inflating the tires so as to bring them down into tractive engagement with the ground. FIG. 6 illustrates how wheels 21 and 22 operate in accordance with the invention when the vehicle is traversing a body of water 76. In this case the air cushion supply has been reduced so as to lower the vehicle relative to the water surface 76; or, alternatively, the wheel tires have been inflated so that the wheels 21 and 22 are thus caused to dip into and engage the water so as to provide additional tractive effort by acting on the water in the nature of paddle wheels. As noted above, by varying the speed of rotation of wheels 21 and 22, any desired maneuvering of the vehicle may be accomplished, such as is especially desirable during a docking operation.

While preferred embodiments of the present invention have been disclosed it will be appreciated that it is not limited thereto but may be otherwise embodied within the scope of the following claims.

What is claimed is:

1. In an air cushion vehicle comprising a body having a longitudinal axis and including means for providing a supporting air cushion under the body including a perimetrically located air cushion space defining means, means for supplying pressurized air to said cushion space, and control means for controlling the supply of pressurized air to vary the vehicle height above the ground surface; a pair of wheels located at opposite sides of said longitudinal axis within the confines of said air cushion space defining means and located within the central third longitudinal portion of the vehicle, each said wheel including a hub rotatably mounted on said vehicle and a tire mounted upon said hub, each tire being variably expandable into terrain contact condition and contractable upon said hub to avoid terrain contact, means for selectively expanding and contracting said tires including a pressurized air supply and an atmospheric vent and a control valve selectively connecting said tires to said air supply and said vent, and an individual drive means for each wheel and including selective drive and braking controls for each wheel individually to control operation of said wheels for aiding in maneuvering said vehicle when said tires are in terrain contact condition.

* * * * *